3,287,637
HIGH FREQUENCY CURRENT MEANS INCLUDING CAPACITIVE PROBE MEMBERS FOR DETERMINING THE ELECTRICAL RESISTANCE OF A SEMICONDUCTOR LAYER
Wolfgang Keller, Pretzfeld, Germany, assignor to Siemens-Schuckertwerke Aktiengesellschaft, Berlin-Siemensstadt, Germany, a corporation of Germany
Filed July 10, 1963, Ser. No. 294,116
Claims priority, application Germany, July 17, 1962, S 80,435
2 Claims. (Cl. 324—62)

My invention relates to a method and means for determining the specific electric resistance of thin semiconductor layers, particularly those epitaxially precipitated upon a substrate.

As a rule, the specific resistance of semiconductor material is determined by measuring an applied voltage and the current which this voltage drives through the material. Semiconductor rods produced, for example, by pulling the material out of a melt or by floating-zone melting, have a circular cross section so that the geometrical dimensions can be readily determined and, by ascertaining the electric resistance of such a rod, the specific resistance of the material can be determined from the measured values and the geometric dimensions. This method fails with extremely thin high-ohmic semiconductor layers as obtained, for example, by epitaxial precipitation of semiconductor material from the gaseous phase. Such epitaxial layers may, for example, have a thickness of only 10 microns. In most cases they are deposited upon a monocrystalline substrate of the same semiconductor material, for example on a wafer of 250 micron thickness having a much lower specific resistance such as 0.01 ohm cm., compared with 1 to 10 ohm cm. resistance of the precipitated material. Measuring an applied voltage and the resulting current does not produce satisfactory results with such layers because the current flow, prevailing for example between two point electrodes contacting the layer, is greatly distorted due to the different resistance conditions between the material of the substrate crystal and the precipitated crystal of the thin layer.

It is an object of my invention to overcome difficulties of the above-mentioned kind and to provide a method and means for readily determining the specific resistance of thin semiconductor layers, particularly high-ohmic epitaxial layers on low-ohmic substrates.

To this end, and in accordance with a feature of my invention, the semiconductor layer to be investigated, or the substrate carrying the layer, is placed between two plate-shaped electrodes in spaced relation to both, the electrodes are connected to a source of high-frequency current so that this current passes between the electrodes and through the intermediate thin semiconductor layer, and the resulting voltage drop across the layer is simultaneously measured as indicative, jointly with the measured high-frequency current, of the resistance to be determined.

Further features of my invention will be apparent from the following in conjunction with the accompanying drawings in which embodiments of measuring devices according to the invention are illustrated by way of example.

The same reference numerals are applied in all illustrations for the same components respectively.

Figure 1:
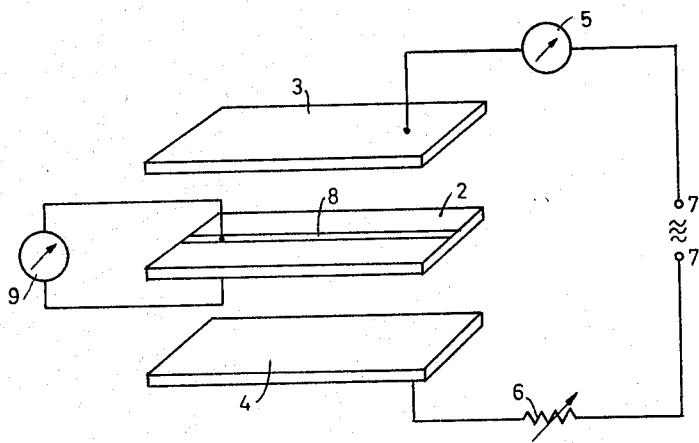
FIG. 1 shows schematically and in exploded fashion a device in which the voltage drop caused across the semiconductor layer by the high-frequency electrode current is measured directly.

According to FIG. 1, a semiconductor wafer or plate 2 is placed between two planar metal plates 3 and 4 so that the semiconductor surfaces are parallel to the respective adjacent electrode surfaces. For the purpose of illustration the electrodes are shown spaced far apart from the semiconductor plate 2, whereas in reality the spacing is rather close, amounting for example to 0.2 mm. between the semiconductor plate and each electrode. The semiconductor plate 2 consists of a substrate having on one or both sides an epitaxially precipitated thin layer of the same semiconductor material, for example silicon, and of a higher ohmic resistance than the substrate.

The two metal plates 3 and 4 are connected through a high-frequency current source 7 through a current measuring instrument 5 and adjustable resistor 6. Attached to the semiconductor disc 2 on opposite sides thereof are two metal-foil strips 8 in parallel relation to each other. These metal strips 8 are connected to a high-frequency voltage measuring instrument 9. The instrument 9 may consist, for example, of a high-frequency electronic-tube voltmeter. When the two electrode plates 3 and 4 are supplied with high-frequency current from source 7, the current passes through the semiconductor plate 2 which is capacitively connected with the metal electrodes 3 and 4. Care must be taken that the field lines of the electric fields are as little distorted as feasible, this being the case with closely spaced planar electrodes of relatively large size as shown in the drawing. The voltage measuring instrument 9 then determines the voltage drop occurring due to the high-frequency current between the top and bottom sides of the semiconductor plate 2.

With a semiconductor plate 2 of 20 x 20 mm. dimensions, for example, the assembly of electrode plates 3, 4 and the intermediate semiconductor plate may have a capacitance of approximately 100 pf. In this case, a current source 7 having a frequency of 50 mc. and a voltage of 330 v. can drive a current of approximately 10 amperes through the assembly. The voltage drop between top and bottom side of the semiconductor 2 is then in the general order of magnitude of 10 mv. The voltage indicated by instrument 9 and the current value indicated by the instrument 5 then permit determining the resistance of the assembly, and since the geometric dimensions are known, the specific resistance can then be determined. If the specific resistance of the substratum is previously known, as is usually the case, the specific resistance of the precipitated thin semiconductor layer is then also derivable from the measuring result.

Another way of using the device is to determine the capacitance of the assembly, for example with the aid of a measuring bridge. Then the current can be computed from the capacitance, the frequency and the measured voltage.

The following numerical example is further illustrative of the method just described. The semiconductor plate 2, consisting of a substrate such as silicon of 20 x 20 mm. dimensions and an epitaxial layer of silicon, is placed between the electrode plates 3 and 4. The proper spacing is effected by interposing a dielectric foil of 0.02 cm. thickness ($\epsilon=5$ approximately). For the total of 4 cm.$^2$ and a total spacing of 2·0.02 cm., there results a capacitance of 44.6 pf. The impedance of this capacitance at 50 mc. is 72 ohm. The resistance of the semiconductor material can be neglected in comparison with the capacitance, so that the current is determined only by the impedance of the 44.6 pf. capacitance. Operating with the above-mentioned frequency and a voltage of 330 v., the current driven through the assembly is equal to 330/72=4.6 A.

The substrate carrying the epitaxial layer has a thickness of 0.5 mm. and a specific resistance of 0.05, these data having been known before the epitaxial layer to be investigated was precipitated upon the substrate. Under these conditions, it can be assumed that the resistance of the substrate is negligible relative to the resistance of the epitaxial thin layer consisting of high-ohmic material. That is, the voltage drop measured by instrument 9 is virtually determined by the epitaxial layer exclusively. Assume that the measured voltage drop is 32 mv. The resistance of the semiconductor plate 2 then amounts to 32/4.6=7 m. ohm. With a layer thickness of 40 microns, the specific resistance $\rho$ of the epitaxial layer can thus be computed as amounting to $$\rho = \frac{7 \cdot 10^{-3} \text{ ohm} \cdot 4 \text{ cm.}^2}{4 \cdot 10^{-3} \text{ cm.}} = 7 \text{ ohm cm.}$$

It will be understood that the numerical data given in the foregoing are illustrative only and that other values are involved with other dimensions and other materials.

Figure 2:
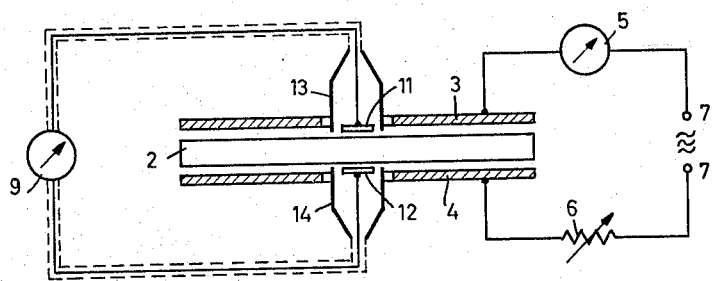
FIG. 2 shows a different device in which the voltage measurement is effected by means of capacitive coupling.

In the embodiment of the resistance measuring device shown in FIG. 2, no foil or strip material is attached to the semiconductor plate 2. In lieu thereof, the voltage is capacitively tapped off with the aid of two additional small metal plates 11 and 12 acting as probes on opposite sides respectively of the semiconductor plate, both being spaced from the plate. The electrode plates 3 and 4 have respective openings in which the probes 11 and 12 are located. The spacing of the probes from the semiconductor plate may be the same as that of the electrode plates, being for example 0.2 mm. Careful shielding of the probes 11 and 12 from the electrodes 3 and 4 is necessary. This is done by means of cylinder-shaped shields 13 and 14 of metal. As in the embodiment of FIG. 1, proper spacing between the electrodes and probes on the one hand and the semiconductor plate on the other hand can be secured by interposing dielectric foils. The measuring operations is performed in the same manner as described above with reference to FIG. 1.

Two devices of the type shown in FIG. 2 can be combined into a particularly sensitive and accurate bridge network. One of the two devices is then used for inserting the semi-conductor substrate with the epitaxial layer to be investigated, whereas the second device is provided, in lieu of the semiconductor plate, with a metal plate of the same size. By connecting the two devices into a Wheatstone bridge whose departure from correct tuning or balance then offers a measure for determining the specific resistance of the semiconductor plate under investigation, the shielding difficulties are reduced. This is so because the measuring device proper as well as the reference device can be given the same stray-field conditions. In lieu of a bridge network, a single measuring circuit according to FIG. 2 may be provided, but the measuring device proper can be made exchangeable for a reference device operating with a metal plate instead of a semiconductor plate.

Figure 3:
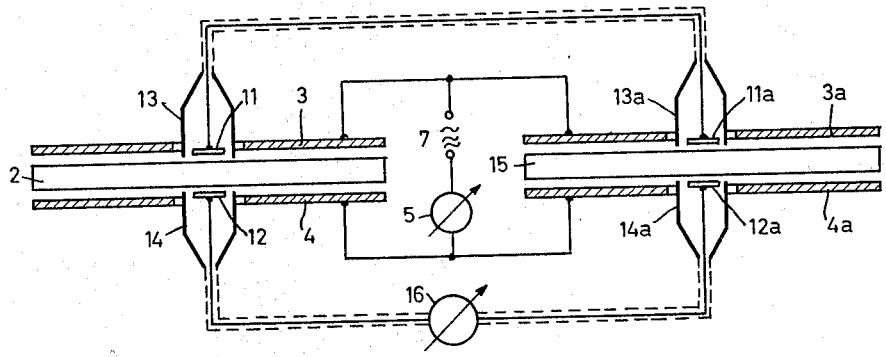
FIG. 3 illustrates a device for capacitive voltage measurement with the aid of a bridge network.

The embodiment shown in FIG. 3 constitute a bridge network of the type just mentioned. An alternating-current source 7 for example of 1000 volt and a frequency of 50 megacycles feeds two devices which are essentially the same as the device shown in FIG. 2 and described above. The only difference resides in the fact that one of these two devices is provided with a semiconductor plate 2, whereas the other device, identified by the addition of the subscript "a" to the corresponding reference numerals, contains a metal plate 15, for example of copper or silver, in lieu of the semiconductor plate, the metal plate having the same dimensions as the semiconductor plate 2. Any other good conducting metal can be used instead of those mentioned. It is only essential that the dimensions of the metal plate 15 are identical with those of the semiconductor plate 2.

The two capacitive probes 11 and 11a are galvanically connected with each other, i.e. they are interconnected by a conductor, preferably shielded, and thus have the same potential. Connected between the probes 12 and 12a is a voltage measuring instrument 16, preferably also by means of shielded conductors. Assuming that the internal resistance $R_i$ of the current source 7 is large relative to the resistance $R_H$ of the semiconductor plate 2, the current I flowing through the device is constant. In this case, the voltage measured by instrument 16 is proportional to the resistance $R_H$ since the resistance of the metal plate 15 is negligibly small. As a result, the measurement is considerably simplified in comparison with the embodiment shown in the preceding illustrations and, the instrument 16 can be calibrated directly in terms of resistance or, if semiconductor plates of given dimensions are used, directly in terms of the specific resistance to be ascertained.

Upon a study of this disclosure it will be obvious to those skilled in the art that my invention permits of various modifications with respect to components, dimensions and circuitry, and hence can be given embodiments other than particularly illustrated and described herein without departing from the essential features of the invention and within the scope of the claims annexed hereto.

I claim:

1. Device for determining the resistance of thin semiconductor layers, said device comprising a semiconductor specimen, two electrodes having respective planar and parallel surfaces spaced from each other a distance larger than the thickness of said semiconductor specimen, said specimen being inserted between the electrode surfaces in spaced relation thereto, said two electrodes having respective openings opposite each other, two capacitive probe members located in said respective openings and insulated from said electrodes, said probe members being spaced from each other a distance larger than said thickness so as to also remain out of contact with the inserted specimen, shielding means surrounding said respective probe members for shielding them from said electrodes, high-frequency current supply means connected across said two electrodes and comprising current measuring means, and high-frequency voltage measuring means connected across said two probe members.

2. Device for determining the resistance of thin semiconductor layers, said device comprising a semiconductor specimen comprising a plate and a semiconductor layer on said plate, each of said layer and said plate having determined dimensions, two electrodes having respective planar and parallel surfaces spaced from each other a distance larger than the thickness of said semiconductor specimen, said specimen being inserted between the electrode surfaces in spaced relation thereto, two additional electrodes similarly spaced and respectively connected to the first-mentioned electrodes for receiving a reference plate, said reference plate having the same dimensions as said plate and comprising electrically conductive material, said pairs of electrodes each having respective openings opposite each other and a capacitive probe member in each opening, said pairs of probe members being spaced from each other a distance larger than said thickness so as to also remain out of contact with the inserted specimen, shielding means surrounding said respective probe members for shielding them from said electrodes, one probe member in each pair being connected with a probe member of the other pair, high-frequency current supply means connected across said two electrodes and comprising current measuring means, and high-frequency voltage measuring means connecting the other probe members.

References Cited by the Examiner

UNITED STATES PATENTS

| | | | |
|---|---|---|---|
| 2,351,201 | 6/1944 | Gillis | 324—64 |
| 2,428,700 | 10/1947 | Eilenberger | 324—61 |
| 2,631,188 | 3/1953 | Clapp. | |
| 2,752,434 | 6/1956 | Dunlap | 323—99 X |
| 2,766,421 | 10/1956 | Wait et al. | |
| 2,802,173 | 8/1957 | Nisle | 324—61 X |
| 2,871,446 | 1/1959 | Wann | 324—62 X |
| 2,934,700 | 4/1960 | Holaday et al. | 324—61 |
| 2,966,628 | 12/1960 | Bosch | 324—61 |
| 3,031,616 | 4/1962 | Hummel | 324—61 |

FOREIGN PATENTS

| | | |
|---|---|---|
| 1,253,531 | 1/1961 | France. |
| 1,089,887 | 9/1960 | Germany. |
| 322,237 | 11/1934 | Italy. |

WALTER L. CARLSON, *Primary Examiner.*

FREDERICK M. STRADER, *Examiner.*

E. E. KUBASIEWICZ, *Assistant Examiner.*